United States Patent [19]

Sukeshita

[11] 4,311,064
[45] Jan. 19, 1982

[54] TRANSMISSION OPERATING DEVICE
[75] Inventor: Kazumi Sukeshita, Koganei, Japan
[73] Assignee: Nissan Motor Co., Ltd., Yokohama, Japan
[21] Appl. No.: 106,912
[22] Filed: Dec. 26, 1979
[30] Foreign Application Priority Data
   Dec. 29, 1978 [JP] Japan ........................... 53-179473[U]
[51] Int. Cl.³ .............................................. G05G 9/18
[52] U.S. Cl. .................................................. 74/473 R
[58] Field of Search .............. 74/473 R, 473 P, 475, 74/477

[56] References Cited
U.S. PATENT DOCUMENTS

| | | | |
|---|---|---|---|
| 2,896,469 | 7/1959 | Norrie | 74/473 R |
| 3,613,474 | 10/1971 | Baumgartl | 74/473 R X |
| 4,050,325 | 9/1977 | Shishido | 74/473 R |
| 4,086,822 | 5/1978 | Kuroda | 74/473 R |
| 4,132,124 | 1/1979 | Iida | 74/473 R |

Primary Examiner—Allan D. Herrmann
Attorney, Agent, or Firm—Thompson, Birch, Gauthier & Samuels

[57] ABSTRACT

A transmission operating device includes a hand lever connected through a control rod to a control shaft of a transmission. In a front-engine and front-wheel-drive car, the engine is traversely arranged and therefore the axis of the control shaft is often located considerably traversely from the longitudinal center axis of the car. According to the invention, a universal joint of the control rod on the side of the control shaft of the transmission is traversely offset toward the longitudinal axis of the car to reduce the deviation of movement of a knob at the upper end of the hand lever from a speed selecting pattern, thereby improving the feeling of speed selecting operation.

3 Claims, 10 Drawing Figures

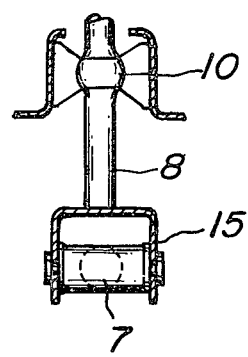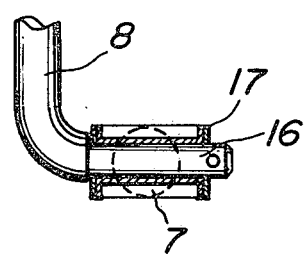

TRANSMISSION OPERATING DEVICE

BACKGROUND OF THE INVENTION

1. Field of the Invention:

The present invention relates to a transmission operating device for an automobile and more particularly for an automobile of the type wherein a control shaft of a transmission and a hand lever connected to the control shaft through a control rod are offset to each other as in a front-engine and front-wheel-drive car with an engine traversely arranged (which is referred to as "FF" car hereinafter).

2. Description of the Prior Art.

With an FF car with a traversely arranged engine and a transmission arranged in series therewith as shown in FIGS. 1 and 2, an axis 4 of a control shaft 3 for operating the transmission 2 is often greatly shifted traversely by an offset S from a center axis 5 of the car. It is usual to support a pivotal end 10 of a hand lever 8 on the center axis 5 by a rear end of a support rod 9 and to connect an extending end of the control shaft 3 and the lower end of the hand lever 8 through a universal joint 6 and a joint 15 by means of a control rod 7. Accordingly, when the hand lever 8 is operated to a selected position as shown in phantom lines in FIG. 3, the hand lever is moved along an oblique path owing to the offset S as shown in FIG. 4 illustrating the movement of a knob 11 at the upper end of the hand lever 8, so that the position of the knob 11 is forwardly shifted by a distance δ from a traverse line 20 of the vehicle passing through the fulcrum 10 to cause an incongruous feeling of operation.

SUMMARY OF THE INVENTION

It is an object of the invention to provide an improved transmission operating device wherein the offset S is reduced to minimize the deviation δ, thereby improving the feeling in speed selecting operation.

To achieve this object, according to the invention a universal joint of a control rod on the side of a control shaft is traversely offset toward a longitudinal axis of a vehicle passing through a fulcrum of a hand lever to reduce the offset S between the universal joint and a joint of the control rod on the side of the hand lever, thereby eliminating the incongruous feeling in speed selecting operation.

The invention will be more fully understood by referring to the following detailed specification and claims taken in connection with the appended drawings.

BRIEF DESCRIPTION OF THE DRAWINGS

FIG. 7 is an enlarged end view of the lower end of the hand lever as viewed in a direction of arrows VII—VII in FIG. 5;

FIG. 8 is an end view similar to FIG. 7 but illustrating another embodiment of the invention ;

DETAILED DESCRIPTION OF THE PREFERRED EMBODIMENTS

Figure 1:
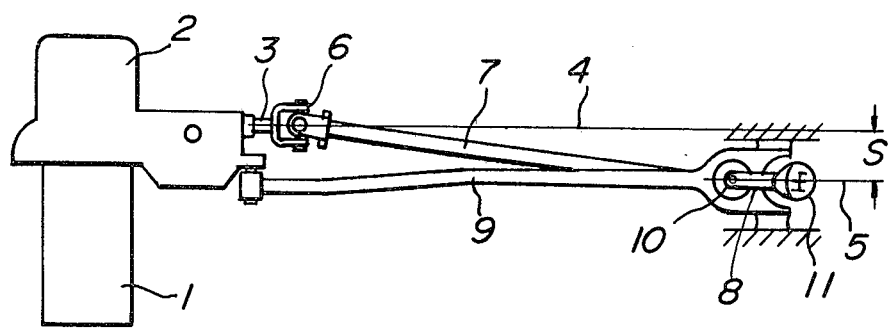
FIG. 1 is a diagrammatical plan view of a transmission operating device of the prior art for use in an FF car with a traversely arranged engine as mentioned above.
Figure 2:
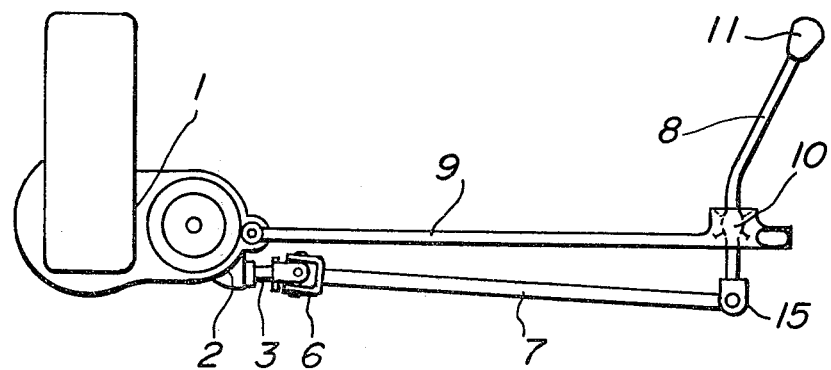
FIG. 2 is a side view of the device shown in FIG. 1.
Figure 3:
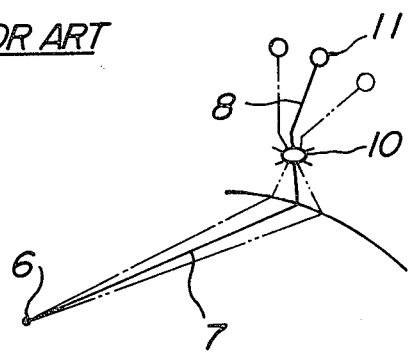
FIG. 3 is a diagrammatical perspective view illustrating movements of a hand lever in speed selecting operation in the prior art.
Figure 4:
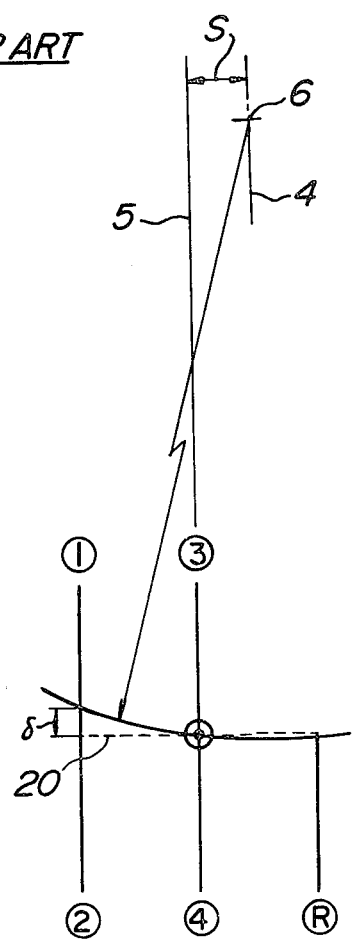
FIG. 4 is an explanatory illustration showing a deviation of the movement of the hand lever from its normal operating pattern in the prior art.
Figure 5:
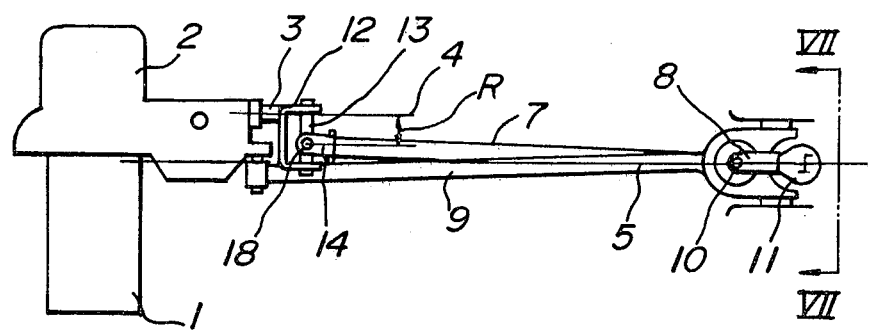
FIG. 5 is a diagrammatical plan view of a transmission operating device according to the invention.

Referring to FIG. 5 illustrating one embodiment of the invention, a transmission 2 is arranged in series with a traversely located engine 1. From the transmission 2 extends a control shaft 3 having one end to which is fixed a U-shaped bracket 12 for journalling a connecting pin 13. To the connecting pin 13 is connected a front end of a control rod 7 through a universal joint 14 traversely offset by a distance R toward the side of the pivotal end of the hand lever or toward a center line 5 of the vehicle. A rear end of the control rod 7 is connected to the lower end of the hand lever 8 through a joint 15. The hand lever 8 is pivotally movably supported at a fulcrum 10 by a rear end of a support rod 9 having a front end secured to the transmission 2.

FIG. 7 which is an enlarged end elevation as viewed in the direction of arrows VII—VII in FIG. 5, illustrates the lower end of the hand lever 8 and the rear end of the control rod 7, which are connected to each other through the joint 15 and positioned in the same central axis.

Figure 6:
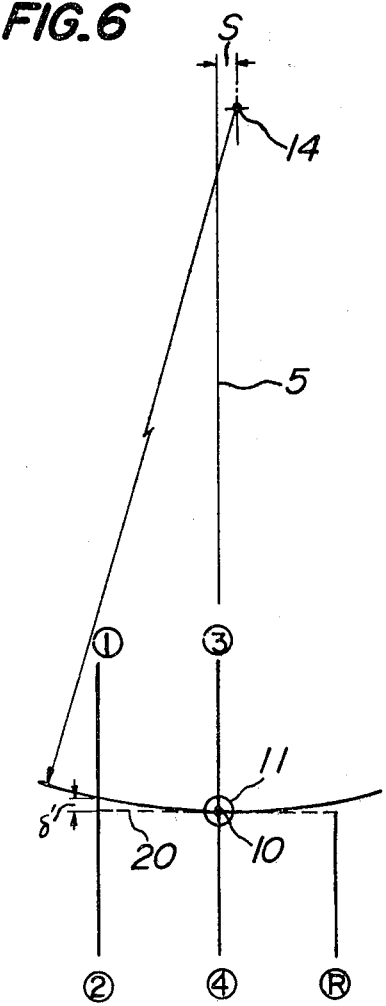
FIG. 6 is an explanatory illustration showing the movement of a knob at the upper end of a hand lever of the device according to the invention.

A connecting position 18 of the universal joint 14 for connecting the front end of the control rod 7 to the control shaft 3 is shifted by the distance R (FIG. 5) toward the center line 5 of the vehicle, thereby reducing the offset S shown in FIG. 6. As a result, movements of a knob 11 at the upper end of the control lever 8 in speed selecting operations more closely approach a traverse line 20 of the vehicle passing through the fulcrum 10 as shown in FIG. 6 to reduce the maximum deviation δ', thereby improving the feeling in speed selecting operation.

In the embodiment shown in FIG. 8, the hand lever 8 is provided at its lower end with a horizontal extension 16 substantially perpendicular thereto and traversely extending on the side of the control shaft 3. To the horizontal extension 16 is connected the rear end of the control rod 7 through a bracket 17, as the result of which in conjunction with the effect of the connecting position 18 of the universal joint 14 shifted toward the center line 5 of the vehicle, the offset S can be further effectively reduced.

Figure 9:
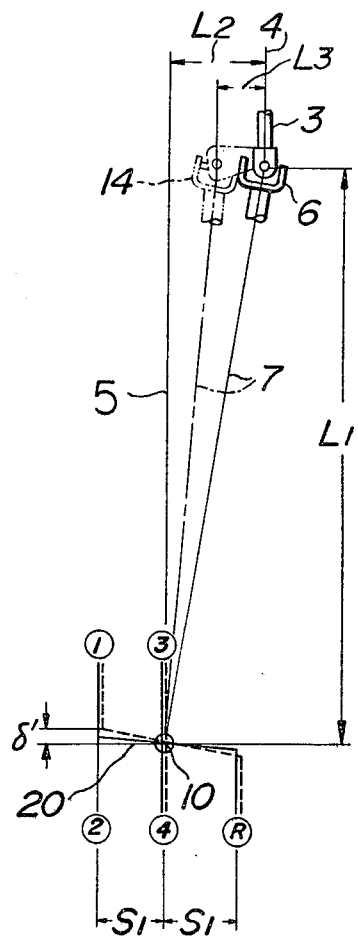
FIG. 9 is an explanatory illustration showing a reduction of the offset according to the invention.
Figure 10:
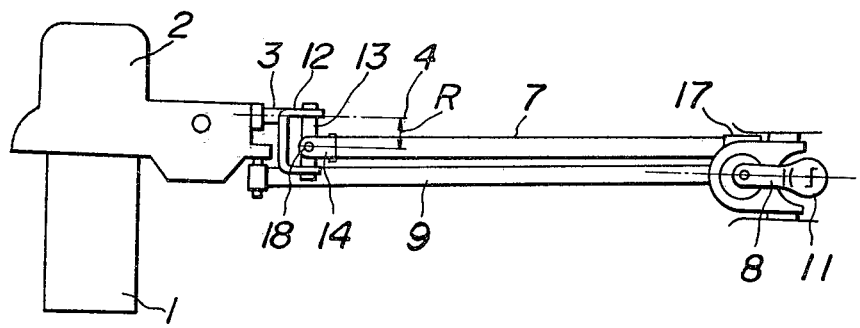
FIG. 10 is a diagrammatic plan view of the embodiment illustrated in FIG. 8.

The effect of the invention is clearly evident from the following example. Referring to FIG. 9 which compares the improvement of the present invention with the prior art, it is assumed that the distance $L_1$ between the fulcrum 10 of the hand lever 8 and the universal joints 6 and 14 is 600 mm, the distance $L_2$ between an axis 4 of the control shaft 3 and the center line 5 of the vehicle passing through the fulcrum 10 is 100 mm, the distance between the center of the knob at the upper end of the hand lever and the center of the fulcrum 10 is 350 mm and the stroke $S_1$ for moving the hand lever in the traverse direction for the speed selecting operation is 50 mm. When the universal joint 6 is not shifted, the maximum deviation δ in the longitudinal direction of the vehicle from the traverse line 20 passing through the fulcrum 10 is 10.5 mm. On the other hand, when the universal joint 14 is shifted by a distance $l_3$ of 50 mm, the maximum deviation δ' is reduced to substantially completely 4 mm to eliminate the incongruous feeling of speed selecting operation.

As can be seen from the above description the device according to the invention reduces the offset in a traverse direction between a control shaft of a transmission and a fulcrum of a control or hand lever, thereby enabling a knob at the upper end of the hand lever to move along a substantially correct speed selecting pattern so as to improve the feeling of speed selecting operation.

It is further understood by those skilled in the art that the foregoing description is preferred embodiments of the disclosed devices and that various changes and modifications may be made in the invention without departing from the spirit and scope thereof.

What is claimed is:

1. Apparatus for manually operating a vehicle transmission, comprising:
    a transmission control shaft offset laterally to one side of the longitudinal vehicle axis;
    a hand lever movably supported by a fulcrum lying on said vehicle axis;
    a control rod for transmitting motion from said hand lever to said control shaft, one end of said control rod being connected to said control shaft by means including a universal joint offset laterally from the axis of said control shaft in the direction of said vehicle axis, and the opposite end of said control rod being connected to said hand lever.

2. The apparatus of claim 1 wherein said universal joint is carrried on a connecting pin extending transversally between the axes of said vehicle and said control shaft, said connecting pin being supported by a U-shaped bracket fixed to said control shaft.

3. The apparatus of claims 1 or 2 further comprising an extension on the lower end of said hand lever, said extension protruding laterally away from said vehicle axis towards the axis of said control shaft, and means for connecting the opposite end of said control rod to said extension.

* * * * *